Sept. 21, 1948.  P. H. SETZLER  2,449,677
WELDING ROD FEEDER
Filed April 30, 1946  3 Sheets-Sheet 1
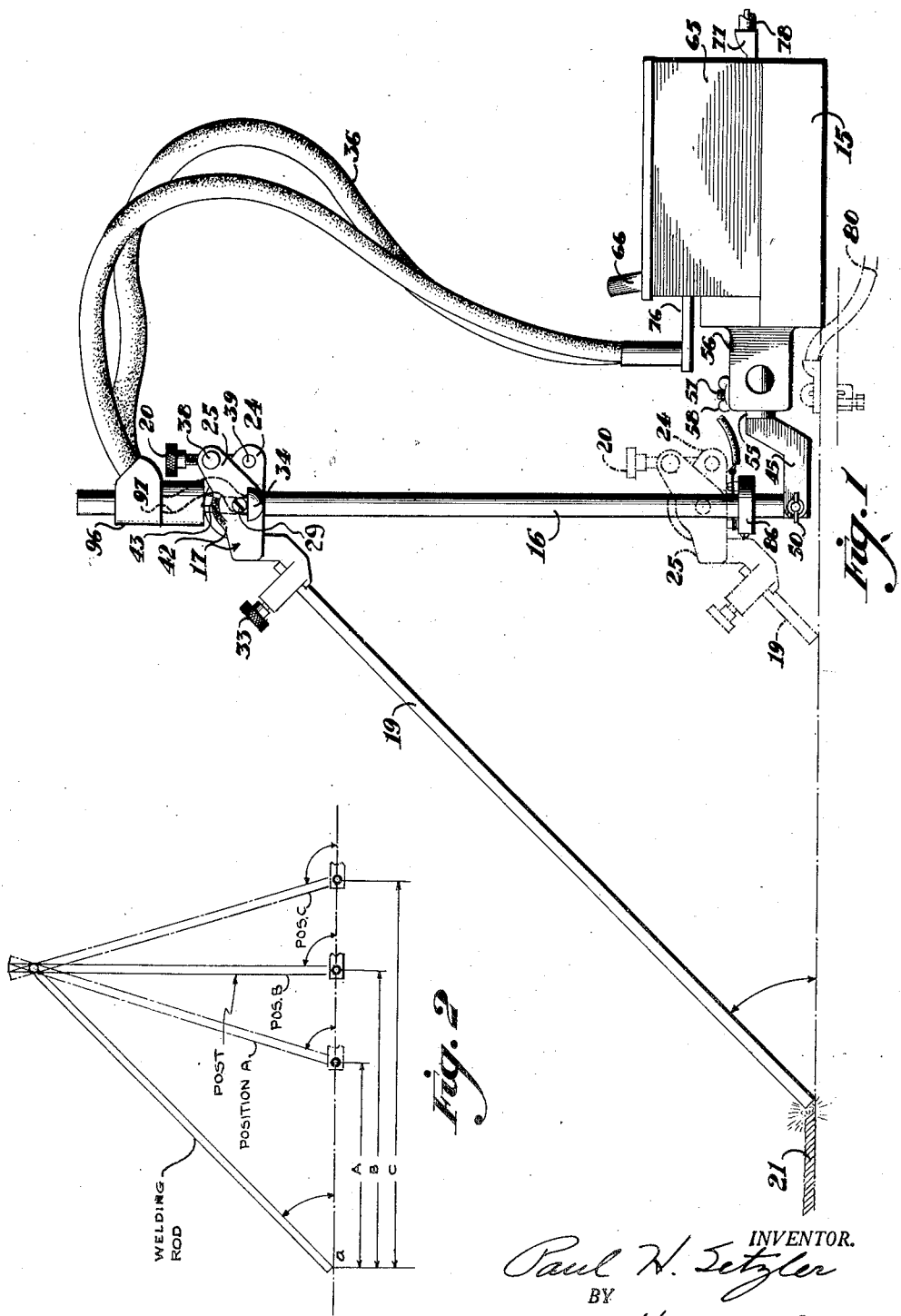
INVENTOR.
Paul H. Setzler
BY
Wood, Arey, Herron & Evans
ATTORNEYS

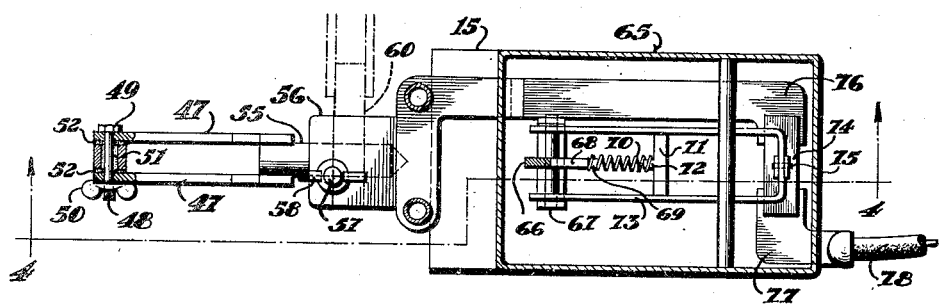
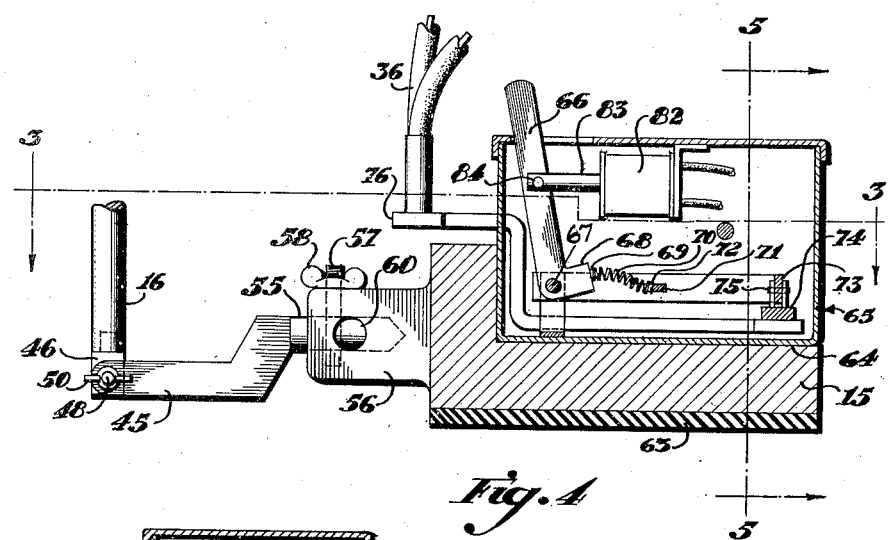
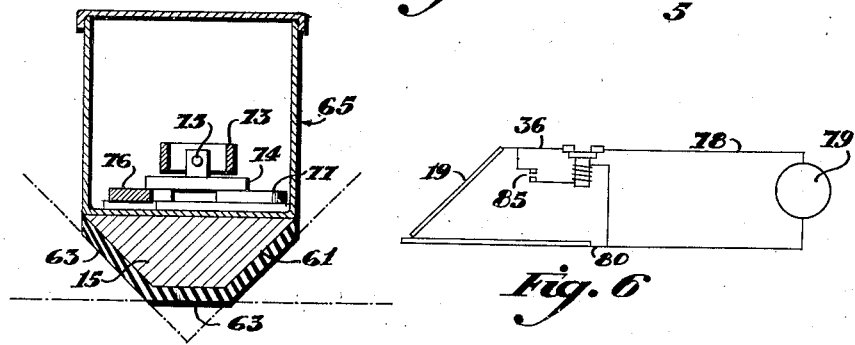

Sept. 21, 1948.  P. H. SETZLER  2,449,677
WELDING ROD FEEDER
Filed April 30, 1946  3 Sheets-Sheet 3
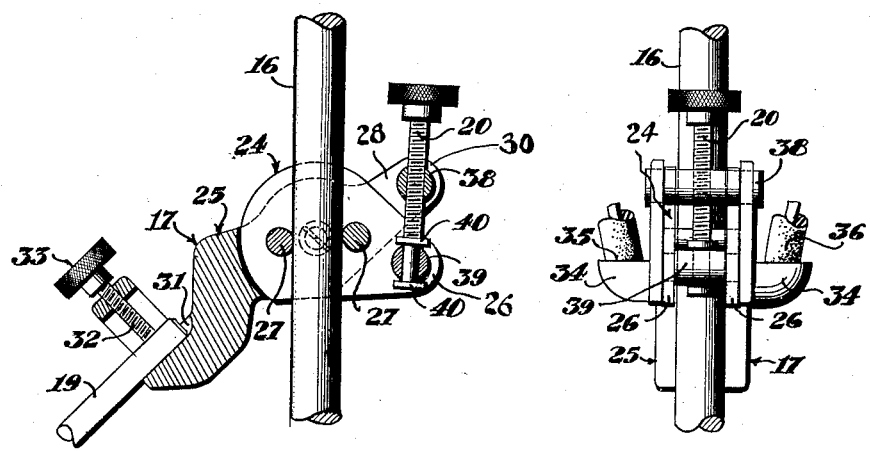
Fig. 7   Fig. 8
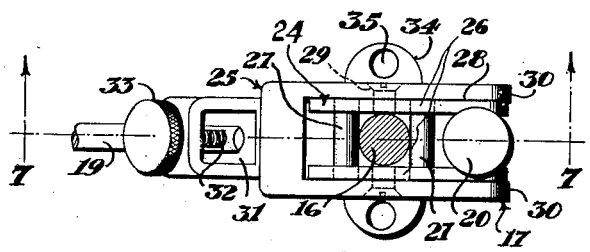   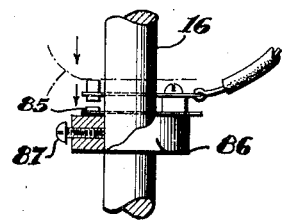
Fig. 9   Fig. 10
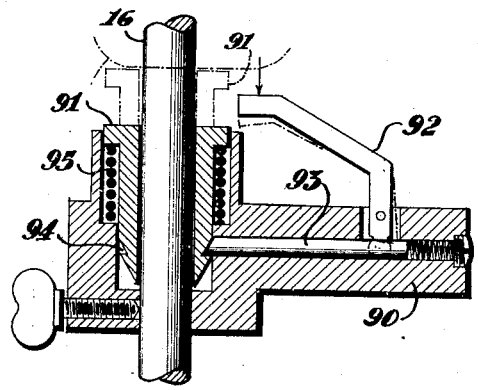
Fig. 11
INVENTOR.
Paul H. Setzler
BY
Wood, Arey, Herron & Evans
ATTORNEYS Patented Sept. 21, 1948

2,449,677

UNITED STATES PATENT OFFICE 2,449,677

WELDING ROD FEEDER

Paul H. Setzler, Hamilton, Ohio

Application April 30, 1946, Serial No. 666,065

16 Claims. (Cl. 219—8)

This invention relates to electric welding. The invention is directed particularly to a simple semi-automatic welding machine which is adapted to be adjusted as to position and set into operation by a welder after which the machine continues to operate without further guidance, until the metal in the length of electrode has been deposited.

The principal purpose of the device is to relieve the welder of the tedious and time-consuming task of guiding the electrode by hand down the seam or path along which the weld is being made. In actual practice only a fraction of the total time available, for example 30%, is devoted to this productive operation; the remainder is expended in preparatory work, for instance, adjusting the parts which are to be welded together, replacing electrodes, arranging the welder in a workable position, cleaning slag, and the like.

In the present machine the electrode is guided and is fed automatically; the apparatus, therefore, requires attention only as to positioning and as to electrode replacement. While it is in operation the welder is free to devote his time to similar machines which may be operating on adjacent parts of the work. In this manner the productive rate of one welder and one welding generator readily may be increased two to threefold and, at the same time, welds of uniform perfection are obtained.

A further objective of the invention has been to provide a machine in which the deposit of metal per inch or unit length of weld readily may be adjusted to suit the requirements of the metals being joined together. The invention also contemplates an apparatus which is self-controlling to the extent that at the completion of its working cycle the welding arc automatically is extinguished whereby the equipment remains idle until a new electrode is inserted and the device is replaced in operation.

In accordance with this invention, briefly, an apparatus is provided including a post or column, a head which is slidable or movable along the column and a clamp provided by the head for supporting the welding electrode at an angle with respect to the work upon which the post suitably is supported. In the operation of the device an arc is struck between the tip of the electrode and the work, and, as metal is melted away from the electrode, the electrode, and the head by which it is carried, descend upon the column. This descension, because of the angularity between the electrode and the workpiece, is manifest as a linear movement of the arc along the work. The action continues until the head reaches the bottom of the post, or until the electrode is consumed.

In the preferred embodiment of the apparatus the central post or column is adjustably supported from a pedestal whereby its angularity with respect to the work surface may be adjusted as well as the angularity of the welding rod with respect to the work. Inasmuch as a given welding rod, under given current conditions will melt away in a given time, this adjustment of angularity of the post provides a convenient control of the rate of deposition of metal with respect to the rate of advancement of the arc. Thus, if the post leans forwardly, e. g., overhangs the work, then the rate of advancement is increased, that is, as the rod melts away its tip moves along the seam and at the same time the head, moving downwardly upon the leaning column, advances the rod in the same direction. Conversely, if the rod leans backwardly away from the seam then the forward movement of the arc along the seam relatively is offset by a forward movement, to a lesser extent of the head along the backward leaning column. This construction readily permits the operator to control the weight or mass of welding metal deposited per unit of length along the welding path.

From the foregoing principles upon which the invention is predicated and from the following detailed description of the drawings in which preferred embodiments of the invention are illustrated, those skilled in the art readily will comprehend the various modifications to which the invention is susceptible.

In the drawings:

Figure 1 is a side elevation of the apparatus with the parts arranged in position during use.

Figure 2 is a diagrammatic view illustrating the manner in which the deposition of welding metal is controlled by adjustment of the post or column of the apparatus.

Figure 3 is a top plan view with the top covering of the column pedestal removed to illustrate switch parts therein.

Figure 4 is a sectional elevation taken on the line 4—4 of Figure 3.

Figure 5 is a cross sectional view taken on the line 5—5 of Figure 4.

Figure 6 is a diagrammatic view of the electric switching circuit.

Figure 7 is an enlarged sectional view of the welding head from which the electrode is supported, taken on line 7—7 of Figure 9.

Figure 8 is a fragmentary elevation of the head looking at the back side thereof.

Figure 9 is a plan view looking down upon the head.

Figure 10 is a view of a switch actuated by the welding head to snuff the arc at the end of a stroke.

Figure 11 is a view showing a modified form of arc snuffing device.

Described in general, with reference to Figure 1 of the drawings, the apparatus comprises a base 15 upon which is adjustably mounted a relatively vertical post or column 16 arranged to guide an electrode holder or head 17 slidably mounted thereon. The head includes a clamp arranged to engage the upper end of an electrode or welding rod 19, the rod being positioned at an angle with respect to the post 16. An adjustment means is provided including a knurled screw which permits the angle of the welding rod 19 to be varied with respect to the post 16 to meet diversified requirements as hereinafter described.

Figure 1 illustrates a typical welding set-up, the post 16 in this instance being set vertically and with the welding rod 19 being disposed similar to the hypotenuse of a right-angled triangle, having its sides corresponding to the work surface and post 16. An arc is struck between the work surface and the tip of the rod and, as the metal of the electrode melts, it is deposited on the work surface thus forming the weld line 21. The head 17, being overbalanced on the rod side, exerts a binding or wedging action with the post 16 upon which it is engaged due to the rotative effect induced by the welding rod in bearing upon the work. Therefore the weight of the head is carried by the post and its descent is regulated by the burning away of the tip of the rod.

As shown in Figures 7, 8 and 9 the holder or head 17 is of two-piece construction, the parts being indicated generally at 24 and 25. Part 24 comprises a guide member made up of two identically shaped side plates 26—26 which are spaced apart a sufficient distance to receive the post 16 therebetween and which are secured in spaced relationship by two pins 27—27. These pins 27 straddle the post 16 at opposite sides thereof with a sufficient clearance to permit the head to slide freely upon the post when the pins are in a line at 90° to the longitudinal axis of the post.

When the head is rocked in either direction as limited by the pins, the engagement or cramping of the pins against opposite sides of the post produces a binding engagement, locking or clamping the head to the post. Thus, the head may be locked in a raised position with the tip of the rod clear of the work surface in preparing the work for the welding operation. When the head is lowered it is rocked in the opposite direction by virtue of the rod being in contact with the work, thus taking up the clearance between the pins and post and frictionally engaging and clamping the head to the post. After the welding operation is started and the top of the rod begins to melt away, the pins release to allow the head to descend slightly and again clamp. The action is very minute, the clamping and unclamping movement amounting to not more than a few thousandths of an inch so that the head drags down the post in a relatively smooth uniform movement to maintain a uniform arc and with very little pressure imposed on the tip of the rod.

Part 25 of the head constitutes a one-piece bifurcated bracket 28 straddling the part 24 and pivotally connected thereto by means of the pivot pins or screws 29 which preferably constitute shouldered screws in screw-threaded engagement in the side plates 26—26. Each screw has a shank portion providing a bearing for the respective legs 30—30 of the bracket 28.

The forward body portion of the bracket 28 is formed to provide a clamp for the welding rod comprising a hollow lug 31 providing a throat to receive the upper end of the welding rod and a clamp screw 32 engaged in a tapped hole through the top of the lug. The clamp screw includes a knurled head 33 to facilitate the removal and replacement of the welding rods.

The bracket portion 28 further includes a pair of semi-circular lugs 34—34 each including a hole 35 formed therein. These lugs provide terminals for a pair of conductors or cables 36 which supply the welding current to the rod 19, the ends of the cables being sweated or soldered in the holes 35.

The welding current supplied by the conductors 36 is necessarily of relatively low voltage and high amperage and since this current must pass through the bracket 29 to reach the welding rod 19, the bracket should be formed from a metal having low electrical resistance to prevent heating. Therefore, the bracket 28 is preferably a casting, or die casting, machine finished as required and formed from a metal having appropriate physical and electrical properties, for example, brass or bronze alloys having relatively low electrical resistance.

The welding rod 19 is preferably the commercial heavy coated type which has a covering of flux on its surface to prevent oxidation at the fusing area and to improve the weld metal. The upper end of the rod engaged in the lug 31 is free of this coating so that an electrical contact is made between the base rod and the body of the bracket 28. At the rearward end of the bracket 28 a knurled adjustment screw 20 is provided which permits the angular relationship of the rod 19 to be varied with respect to the post 16. The screw 20 is engaged in a tapped hole formed in a cross pin 38 spanned between and pivotally mounted in the rearward ends of the legs 30—30. The lower end of the screw 20 is loosely pivoted in a similar cross pin 39 secured in the opposite side plates 26—26. The screw 20 is locked to the pin by the collars 40—40 secured to the screw and engaging the upper and lower sides of the pin as shown in Figure 7.

By virtue of the pivotal connection between the parts 24 and 25, adjustment of the screw 20 changes the angular relationship between the two parts. Since the guide member 24 is prevented from angular movement because of its engagement with the post 16, actuation of the screw 20 therefore changes the angle of part 25 and the rod 19 carried thereby with respect to the post.

In order to enable the operator to set the welding rod at various angles proper for welding various alloys or metal thicknesses, the head or holder includes a graduated scale 42 and an index mark 43. The scale 42 is located at one or both sides of the movable part 25 and the index mark on the stationary part 24. By the use of this arrangement, the angular setting of the rod for various work set-ups may be charted, for example, the setting for a particular job may be determined originally by experiment and the setting charted for future reference.

Post 16 is adjustably mounted at its lower end to the base 15, being pivotally supported in a bifurcated holder or bracket 45. For this purpose the lower end of the post 16 includes a tongue having opposed flat surfaces 46 on opposite sides thereof. This tongue is disposed between the limbs 47—47 of the bracket 45, a hole being drilled through the limbs and the post through which is passed a screw 48. This screw includes a head 49 bearing against one of the limbs 47 and a wing nut 50 is screwed upon the opposite end of the screw and bearing against the opposite limb. The post 16 may be electrically insulated from the base at this point by means of a sleeve or tube 51 formed preferably of a dielectric fibrous material and surrounding the screw 48 to insulate the screw from the post. A pair of fiber washers 52—52 are placed between the respective limbs 47—47 and the flat surfaces 46 of the post to insulate limbs 47 from the post, thus completely insulating the post from the bracket 45 and base 15. When the wing nut is tightened the post 16 is frictionally clamped in position between the limbs in any desired angular relationship. This adjustment functions in cooperation with the angularly adjutable welding rod holder 17 in the following manner.

In the practice of the electric arc welding process it is desirable to control the feed of the rod and weld deposit speed according to several factors, chief among which are the thickness and composition of the metal, the style of bevel or scarf, the diameter of welding rod and the mass or volume of the weld required. Ordinarily in hand welding the requirements of the particular job are suited by the operator through his skill in manipulating the rod for proper rate of rod feed and rate of weld deposit and by his knowledge of the art.

The angularity or verticality of the post 16 with respect to the work surface determines the length of weld which may be produced by any one electrode inasmuch as electrodes of any size will be consumed in a given length of time at proper current settings. It has been found that most electrodes will burn off at the rate of 8" to 10" per minute regardless of size if proper current for size is applied.

Figure 2 shows three respective positions of the post 16 for producing, from a single electrode, a weld short in length but heavy in cross section, at A; a weld C of substantial length but relatively light in cross section; or a weld B which is intermediate the two weld lengths A and C, both as to length and cross sectional area. These variations are obtained respectively by leaning the post 16 backwardly with respect to the welding rod, by leaning the post 16 forwardly over the work, or by positioning the post in a substantially vertical position.

Thus, with the post vertically mounted, as at position B, the tip of the welding rod will traverse the weld length B as the head slides down the post. However, it will be seen that if the post is in position C, leaning forwardly over the work, and with the welding rod held at the same relative angle with respect to the work, then as the head slides down the post it is also, relatively, moving away from the starting point of the weld, and by the time the head has reached the bottom of the post, i. e., by the time the rod has been consumed, a weld of C length has been produced. The converse is true if the post 16 leans backwardly as in position A. In this case as the head slides down the post it is moving forwardly, or subtractively, with respect to the starting point. Therefore, the total rod will be deposited in a relatively short distance A and the cross sectional area of the metal deposited in this manner will be relatively heavy. Thus, by simple adjustment of the post, the welder conveniently is enabled to deposit metal, per unit of length, in accordance with the weight of the material being welded or in accordance with scarf requirements.

If the nature of the work requires, the post and rod may be set substantially parallel to each other, thereby causing the weld rod to feed virtually in a straight line lengthwise. This setting is desirable with reference to welding cylindrical work, the work being located in a fixture permitting it to be rotated as in a lathe to deposit a weld around its circumference.

The bracket 45 upon which the post 16 is mounted includes a stub shaft 55 which is pivotally supported in a lug 56 as part of the base 15. A locking screw 57 is loosely carried in a hole drilled in this lug, the shank of the screw including an arcuate recess conforming to the diameter of the stub shaft 55. The upper end of the screw 57 includes a wing nut 58 screw threaded thereon and upon tightening this nut the recessed portion of the screw bears or wedges against the stub shaft 55 serving to prevent rotation of it. In this manner the post may be adjusted angularly in a direction lateral to the base for applying a fillet weld along the juncture of horizontal and vertical work pieces, sometimes called "flat fillet welding." The arrangement is likewise useful in adapting the apparatus to special applications such as work having a longitudinal flange, rib or corrugation along which a weld is required.

The lug 56 further includes a transverse bore 60 which serves to mount the bracket 45 transversely to the base 15 as shown in broken lines on Figure 3. The bracket is transposed by loosening the wing nut 58, slipping the stub shaft out, replacing it in the transverse bore 60 and tightening the wing nut. Special classes and conditions of work are served by this adjustment, for example, in adjusting the apparatus to jobs where the post 16 must be offset from the base 15 as in depositing a weld along a vertical wall of a length requiring several passes or successive settings of the apparatus. In this case the base 15 is spaced away from the wall with the rod disposed at an angle intermediate to the horizontal and vertical work surfaces with the tip of the rod at the vertex of the two surfaces to join them by the application of a fillet weld.

As shown in Figures 4 and 5 the base is of relatively heavy construction in order to provide sufficient ballast to sustain the post 16 in an upright position without danger of overtipping. In order to make it capable of being placed upon angularly related or V-shaped work surfaces, the base 15 may include chamfered sides 61 at opposite sides thereof, thus centering the base on the work over the seam to be welded.

Since the base is usually placed directly upon the work, it may be desirable, for electrical reasons, to insulate it. The bottom and sides of the base 15 therefore may include a covering or layer of electrical insulating material such as rubber or plastic composition as indicated at 63.

The welding apparatus preferably includes a semi-automatic electrical control system designed to break the circuit and extinguish the arc when the head reaches the end or lower limit of travel; that is, when the rod is used up. For this purpose the base is recessed to provide a seat for a switch casing indicated at 65, which is capable of being actuated either manually or automatically.

As shown in Figures 3 to 5 inclusive, the switch is of the manually operated spring toggle type having for this purpose an actuating lever 66 pivoted at its lower end upon a cross rod or pin 67 within the casing. The upper end of the lever extends through a slot in the top of the casing 65. The lower end of the lever includes a right angle extension 68 similar to a bell crank lever and this portion includes a tang 69 adapted to receive one end of a compression spring 70, the spring being seated against the squared end of the extension 68. The opposite end of the spring 70 is seated against a cross bar 71 having a tang 72 to secure the spring in place.

The cross bar 71 is secured to a U shaped switch arm 73 the respective legs of which are likewise pivoted at their rearward ends upon the cross pin 67. The forward or transverse member of the switch arm 73 carries a contact bar 74, pivotally mounted as at 75, to allow the bar to rock slightly. The opposite ends of the contact bar establish electrical contact with the respective stationary contact bars 76 and 77.

As shown in Figure 3 the bar 76 is in electrical connection with the cables 36 which supply one side of the circuit to the head and welding rod. The bar 77 is electrically connected to a supply cable 78, which is in connection with the generator 79 or other source of power. When the switch is in the "on" or closed position as shown in Figure 4 the welding rod is in electrical connection with the current supply. The opposite side of the circuit is completed by the cable 80 which is in electrical connection with the work, being bolted or clamped thereto as shown in broken lines in Figure 1. This cable is connected to the source of power to complete the circuit.

The switch may be of the over center, snap type and actuation of lever in either direction causes the spring 70 to compress. On reaching a condition of maximum compression slightly past dead center or alignment of the tangs 69 and 72 the spring causes the switch arm 73 to snap to an open or closed position as the case may be.

A semi-automatic control system incorporated in the apparatus may consist of a circuit breaker which extinguishes the arc immediately upon the head reaching its lower limit of travel and thus avoids the continued burning of the arc in one spot, resulting in damage to the work. This control system incorporates a solenoid 82 secured interiorly of the switch casing 65, the armature shaft 83 being pivotally connected to the switch lever 66 as at 84. The solenoid is thus arranged to draw the lever to the "off" or switch open position upon being energized, although normally not interfering with manual actuation of the switch.

As shown in the electrical diagram Figure 6, the opposite ends of the solenoid winding are connected respectively, one end to the power supply line 89 and the other end to one terminal of a normally open limit switch 85. The opposite terminal of this switch is connected to the line 36 which is energized to supply current to the welding rod when the main switch arm 73 is in closed position. Therefore, when the contacts of switch 85 are closed the solenoid will be energized to open the main switch arm 73 and open the circuit to the welding rod 19.

Limit switch 85 is carried upon a collar 86 slidably mounted on the lower portion of the post 16 as shown in Figures 1 and 10. The collar includes a set screw 87 by means of which it may be adjusted with respect to its vertical position on the post so that the cut-off point for the weld travel may be preset. The switch is arranged to be engaged by the lower side of the head or holder in its descent of the post and, upon closing the switch contacts, the solenoid 82 is energized to open the main switch. This opens the circuit to the welding rod to extinguish the arc and deenergize the solenoid. Because of its snap action the main switch arm 73 remains in open position until reset manually. When the used welding rod is replaced and the apparatus repositioned and set up, the switch arm 73 again is actuated manually to close the circuit and initiate the welding operation.

A modified arrangement for extinguishing the arc is illustrated in Figure 11 in which essentially the same purpose is served although the device operates mechanically instead of electrically. The device comprises essentially an adjustable mounting bracket 90 providing a mounting for a spring-pressed plunger 91 in the form of a collar slidably disposed upon the post 16. The device includes a trigger 92 pivotally mounted in the bracket and connected to one end of a latching bar 93 slidably carried in the bracket, the opposite end of the bar being chamfered to engage a groove 94 formed in the lower portion of the plunger 91.

The device is set by manually pressing the plunger 91 downwardly against the pressure of the compression spring 95 causing the end of the latch bar 93 to engage in the groove 94 of the plunger.

The trigger is arranged to be engaged and tripped by the lower side of the head or rod holder when it reaches its lower limit of travel. Upon tripping or actuating the trigger, the latch bar is withdrawn sufficiently to disengage the plunger 91, whereupon it snaps upwardly by virtue of the spring 95 and raises the holder a sufficient distance to break the arc between the tip of the rod and the work. Thus the circuit is opened and damage or burning of the work is avoided.

The apparatus is thus self controlling after being set up and positioned by the operator. In practice a single operator may take care of a number of the machines, since little or no attention is required other than making the initial adjustment and closing the switch to initiate the operation.

In setting up or adjusting the apparatus, the rod holder or head is elevated to the top of the post 16 with the top of the rod clear of the work surface. In this position, as previously described, the head binds or clamps and will not descend or slide down the post.

This permits the operator conveniently to make the required angular adjustment of the head by manipulating the adjusting screw 20. When the desired scale reading is obtained the post is swung angularly to bring the welding rod into contact with the work surface, thereupon the head rocks rearwardly, binding or cramping the pins 27—27 against the post to lock and sustain the holder. After the weld is struck and the tip of the rod begins to melt away the pressure of the pins against the post releases and immediately the head descends slightly then reengages the post. The amount of weight imposed upon the head has no effect upon the pressure of the tip of the rod against the work surface. As previously mentioned, this pressure is very slight amounting to approximately one-half the rod weight.

As shown in Figure 7, showing the device in welding position, the head is held in cramped position on the post by the slight pressure of the tip of the rod on the work surface. The weight of the head, cable guide and cables is thus carried by the post, not by the welding rod.

A preferred use of the present apparatus is in connection with the commercial heavy coated electrode rods. In the use of such rods the metal of the rod melts away ahead of the coating surrounding it; consequently the tip of the rod is supported by the coating and the distance between the metal and the work surface determines the arc length. If the metal of the rod is in direct contact with the work a short circuit will result and the arc will be extinguished. The high temperature in the area of the arc substantially weakens the rod coating; therefore it is highly important that the pressure against the tip be sufficiently light to avoid crumbling the coating and causing the metal of the rod to contact the work and short out.

If the welding rod is of the heavy coated type the coating thereof will rest upon the work surface and, being of an insulative nature, will prevent an arc from being struck automatically. However, the apparatus may be brought into operation by placing a small ball of steel wool in the crevice between the end of the metallic welding rod and the work or, if desirable, the arc may be struck by applying a carbon stick momentarily at the tip of the rod.

As shown in Figure 1, the post 16 may be provided with a cable guide 96 to which is secured the ends of the cables 36. The guide comprises a sleeve loosely fitted upon the post and freely slidable thereon and resting upon the top of the holder 17. The ends of the cables are connected to the holder by the stranded bare wire of the cables or by multiple strand flexible connectors or "pigtails" 97, as shown in dotted lines. This arrangement avoids any difficulty as may arise from the weight of the cables tending to rotate the holder and cause it to release its grip upon the post and thereby makes the holder more readily responsive to changes in pressure of the rod to permit accurate government of rod pressure.

Uniform seams and welds presenting smooth and even surfaces are produced by the apparatus. When an electrode has been consumed, another electrode is replaced and the unit repositioned so that the tip of the new electrode is at the terminal point of the preceding weld length. In this manner an operator who has had little skill in hand welding is able to produce quality welds in which the points at which electrodes were replaced are not discernible except upon very careful scrutiny.

Having described my invention, I claim:

1. An apparatus for depositing a weld upon a work surface comprising: a base, a welding rod holder, said holder arranged to engage one end of a welding rod and sustain the rod at a fixed angle to the work surface, a substantially vertical post for guiding said holder relative to the work surface for feeding the rod downwardly by gravity, and an electrode operated post engaging device on the holder for regulating the descent of the holder by disengagement with the post as the rod is deposited upon the work surface.

2. An apparatus for depositing a weld upon a work surface comprising: a base, a post mounted upon said base, a welding rod holder slidably mounted on the post, said holder arranged to engage one end of a welding rod and sustain the rod at an angle to the post with the opposite end of the rod disposed upon the work surface, and transverse members on said holder frictionally engageable with the post to establish a wedging action between the post and the holder effective to sustain the holder and permit the descent of the holder to be regulated by the rate of deposition of the welding rod upon the work surface.

3. A welding apparatus for depositing a weld upon a work surface comprising: a base, a post mounted upon said base, an electrode holder, slidably mounted on said post, clamping means on said holder adapted to engage one end of an electrode to sustain the same at an angle to the post, means on said electrode holder adapted to vary the angle between the electrode and said post and transverse members on said holder straddling said post to frictionally bind the holder to the post to control descent of the holder as the electrode is deposited upon the work surface.

4. A welding apparatus for depositing a weld upon a work surface comprising: a base, a post mounted upon said base and disposed in angular relationship with said work surface, and an electrode holder, said holder slidably mounted upon the post and adapted to engage one end of an electrode to sustain the same at an angle to the post, an adjustable clamping device on said electrode holder adapted to vary the angle between the electrode and said post, a clamping device on said post permitting the angle of the post to be varied with respect to the work surface to dispose the opposite end of the electrode in contact with the work surface, and transverse members on said holder straddling said post to frictionally bind the holder to the post when the electrode is lifted manually out of contact with the work surface and to regulate the rate of descent of the holder when the same is manually lowered with the end of the electrode in contact with and being deposited upon the work surface.

5. A welding apparatus for depositing a weld upon a work surface comprising: a base, a post mounted upon said base, and disposed in angular relationship with the work surface, an electrode holder slidably mounted on the post, said holder arranged to loosely engage said post and to frictionally bind with the post when the holder is rocked by the electrode resting on the work, means for supplying an electric welding current to said holder, means on said holder to engage one end of an electrode to sustain the same at an angle to the post with the opposite end of the electrode disposed upon the surface of the work to sustain the holder, whereby the holder descends on said post by gravity as the lower end of the electrode melts away, and automatic means for cutting off said current supply when the holder descends to a predetermined point on the column.

6. A welding apparatus for depositing a weld upon a work surface comprising: a base, a post mounted upon said base, and disposed in angular relationship with the work surface, an electrode holder slidably mounted on the post, said holder arranged to loosely engage said post and to frictionally bind with the post when the holder is rocked by the electrode resting upon the work surface, means for supplying electric welding current to said holder, a manually operated switch for controlling said current, means on said holder to engage one end of an electrode to sustain the same at an angle to the post with the opposite end of the electrode disposed upon the surface of the work, whereby the holder slides down said post as the lower end of said electrode melts away, and automatic means for opening said switch when the holder descends to a predetermined point on the post.

7. A welding apparatus for depositing a weld upon a work surface comprising: a base, a post mounted upon said base, an electrode holder slidably mounted on said post, said holder arranged to loosely engage said post and to frictionally bind with the post when the holder is rocked by the electrode resting upon the work surface, clamping means on said holder adapted to engage one end of an electrode to sustain the same at an angle to the column, means on said electrode holder to supply a welding current to the electrode, means for supplying a welding current to the work to establish a welding arc between the tip of the electrode and the work surface, and automatic means to extinguish the arc when the holder descends to a predetermined point on the post.

8. A welding apparatus for depositing a weld upon a work surface comprising: a base, a post mounted upon said base, an electrode holder slidably mounted on said post said holder arranged to loosely engage said post and to frictionally bind with the post when the holder is rocked by the electrode resting upon the work surface, clamping means on said holder adapted to engage one end of an electrode to sustain the same at an angle to the post and means for supplying electric welding current to the electrode, whereby a weld is deposited automatically as the holder descends the post, a manually operated switch for controlling the welding current, and a secondary switch, and means connected to the secondary switch operable to open the manually operated switch, said secondary switch mounted upon the post for actuation by the electrode holder to automatically open the manually operated switch when the weld is completed.

9. An apparatus for depositing a weld upon a work surface comprising: a base, a post mounted upon said base, a welding rod holder slidably mounted on the post, said holder arranged to engage one end of a welding rod and sustain the rod at an angle to the post with the opposite end of the rod disposed upon the surface of the work to support the holder, and a spring loaded plunger associated with said post, said plunger having a trigger arranged to be actuated by the holder to release said plunger to cause the plunger to raise said holder and rod out of contact with the work surface when the holder slides to a predetermined point on the post 10. A welding apparatus including a column, a head slidable upon said column, an electrode holder pivotally mounted on said head, said electrode holder including a welding rod clamp at one side of said pivotal mounting and adjusting means interconnecting said electrode holder with said head at the other side of said pivotal mounting whereby the angularity of the electrode holder, with respect to said column, may be adjusted through pivotal movement of the electrode holder upon said head and transverse members on said holder straddling said post to frictionally bind the holder to the post to control descent of the holder as the electrode is deposited upon the work surface.

11. A welding apparatus including a column, a head slidable upon said column, an electrode holder pivotally mounted on said head including a welding rod clamp at one side of said pivotal mounting and adjusting means interconnecting said electrode holder with said head at the other side of said pivotal mounting whereby the angularity of the electrode holder, with respect to said column, may be adjusted through pivotal movement of the electrode holder upon said head, said head including an upper arcuate surface, a follower slidably mounted on said column and having its lower surface engaging the arcuate surface of said head, said follower constituting an intermediate cable supporting unit to relieve said head from cable strain.

12. A welding apparatus comprising, a column, a head including a pair of plates which are spaced apart from one another to reside at opposite sides of said column, transverse members for holding said plates in spaced relationship, said transverse members being spaced apart from one another to reside at opposite sides of said column for exerting a clamping action on said column upon pivotal movement of said head, with respect to said column, for governing the descent of movement of the head upon the column, and an electrode holder carried by said head.

13. A welding apparatus comprising a column, a head guided by said column, an electrode holder carried by said head, said head including a pair of transverse members straddling the column effective upon engagement of an electrode carried by said holder with a work piece for preventing the descent of the head upon the column and for releasing the head as the electrode burns away whereby the head may fall freely until the electrode reengages the work piece.

14. A welding apparatus comprising, a column, an electrode clamp, and a head for supporting said clamp and slidably engaging said column, said head being rockable upon said column and having a friction clamp device which is effective for limiting the descent of the head upon the column through rocking movement thereof upon engagement of a welding electrode carried by said clamp with a work piece, said head being overbalanced to rock to an unclamped position as the welding electrode burns away from said work piece, whereby said head is free to descend upon said column until the welding electrode reengages the work piece.

15. A welding apparatus for depositing a weld upon a work surface comprising: a base, a post mounted upon said base, an electrode holder slidably mounted upon said post, said holder loosely engaging said post and arranged to frictionally bind with the post when the holder is rocked by the electrode resting upon the work, clamping means on said holder adapted to engage one end of an electrode to sustain the same at an angle to the post and a follower slidably engaged on said post and resting upon said holder, said follower constituting a cable supporting unit to relieve the holder of cable strain.

16. A welding apparatus for depositing a weld upon a work surface comprising: a base, a post mounted upon said base and disposed in angular relationship with the work surface, an electrode holder slidably mounted on the post, said holder having transverse members frictionally engageable with the post, said transverse members being spaced apart from one another to reside in opposite sides of said post for exerting a clamping action on the post upon manual pivotal movement of the head with the head elevated and the electrode out of contact with the work surface to lock the holder in an elevated position, said holder being releasable by manually pivoting the same in a reverse direction and lowering the holder to an operating position with the electrode contacting the work surface.

PAUL H. SETZLER.

REFERENCES CITED

The following references are of record in the file of this patent:

UNITED STATES PATENTS

| Number | Name | Date |
|---|---|---|
| 1,498,167 | Hill | June 17, 1924 |
| 2,204,545 | Faunce | June 18, 1940 |
| 2,269,484 | Ronay | Jan. 13, 1942 |
| 2,274,742 | Ronay | Mar. 3, 1942 |
| 2,280,629 | Chapman | Apr. 21, 1942 |
| 2,370,716 | Carter | Mar. 6, 1945 |
| 2,387,864 | Tyrner | Oct. 30, 1945 |

FOREIGN PATENTS

| Number | Country | Date |
|---|---|---|
| 112,353 | Great Britain | Mar. 9, 1917 |
| 550,727 | Great Britain | Jan. 21, 1943 |